(12) United States Patent
Salter et al.

(10) Patent No.: US 12,227,092 B2
(45) Date of Patent: Feb. 18, 2025

(54) SYSTEMS AND METHODS FOR PROVIDING BIDIRECTIONAL CHARGING BETWEEN ELECTRIFIED VEHICLES AND ELECTRIFIED RECREATIONAL VEHICLES

(71) Applicant: FORD GLOBAL TECHNOLOGIES, LLC, Dearborn, MI (US)

(72) Inventors: Stuart C. Salter, White Lake, MI (US); James Baumbick, Northville, MI (US); Annette Lynn Huebner, Highland, MI (US); Peter Phung, Ontario (CN); Ryan O'Gorman, Beverly Hills, MI (US); David Brian Glickman, Southfield, MI (US); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 853 days.

(21) Appl. No.: 17/333,140

(22) Filed: May 28, 2021

(65) Prior Publication Data
US 2022/0379743 A1    Dec. 1, 2022

(51) Int. Cl.
*B60L 53/00*    (2019.01)
*B60L 58/12*    (2019.01)

(52) U.S. Cl.
CPC ............... *B60L 53/00* (2019.02); *B60L 58/12* (2019.02)

(58) Field of Classification Search
None
See application file for complete search history.

(56) References Cited

U.S. PATENT DOCUMENTS

| | | | |
|---|---|---|---|
| 9,527,394 B1* | 12/2016 | Tang | B60W 10/26 |
| 2013/0175973 A1* | 7/2013 | Jones | B60L 3/12 |
| | | | 320/105 |
| 2017/0282740 A1* | 10/2017 | Ichikawa | H02J 7/0045 |
| 2018/0072178 A1* | 3/2018 | Williams | B60L 1/00 |
| 2019/0165591 A1* | 5/2019 | Kisacikoglu | B60L 53/20 |
| 2020/0215929 A1* | 7/2020 | Javaid | B60L 55/00 |
| 2021/0291692 A1* | 9/2021 | Masoud | H02J 50/05 |

FOREIGN PATENT DOCUMENTS

| | | |
|---|---|---|
| KR | 20120095141 A | 8/2012 |
| WO | 2019/226630 A1 | 11/2019 |

* cited by examiner

*Primary Examiner* — James J Lee
*Assistant Examiner* — Wenyuan Yang
(74) *Attorney, Agent, or Firm* — David B. Kelley; Carlson, Gaskey & Olds, P.C.

(57) ABSTRACT

Systems and methods are disclosed for coordinating and executing bidirectional energy transfer events between electrified vehicles and one or more participating electrified recreational vehicles. Energy may be transferred from an electrified vehicle to one or more electrified recreational vehicles, from the one or more electrified recreational vehicles to the electrified vehicle, or both during bidirectional energy transfer events. The proposed systems and methods may further be configured to provide various charging configurations between the electrified vehicle and the one or more electrified recreational vehicles.

18 Claims, 12 Drawing Sheets

SYSTEMS AND METHODS FOR PROVIDING BIDIRECTIONAL CHARGING BETWEEN ELECTRIFIED VEHICLES AND ELECTRIFIED RECREATIONAL VEHICLES

TECHNICAL FIELD

This disclosure is directed to systems and methods for coordinating and achieving vehicle-to-recreational vehicle bidirectional energy transfers.

BACKGROUND

Electrified vehicles differ from conventional motor vehicles because they are selectively driven by one or more traction battery powered electric machines. The electric machines can propel the electrified vehicles instead of, or in combination with, an internal combustion engine. Recreational vehicles such as motorcycles, all-terrain vehicles (ATVs), and utility vehicles (UTVs) may also be electrified and thus can likewise include battery powered electric machines for propelling the recreational vehicles. The traction batteries of both electrified vehicles and electrified recreational vehicles must be periodically charged for replenishing energy storage levels.

SUMMARY

A vehicle-to-recreational vehicle energy transfer system according to an exemplary aspect of the present disclosure includes, among other things, an electrified vehicle, an electrified recreational vehicle, and a control module programmed to control a transfer of energy from the electrified vehicle to the electrified recreational vehicle or from the electrified recreational vehicle to the electrified vehicle during a bidirectional energy transfer event.

In a further non-limiting embodiment of the foregoing system, the electrified vehicle includes a first traction battery pack and a first electric machine, and the electrified recreational vehicle includes a second traction battery pack and a second electric machine.

In a further non-limiting embodiment of either of the foregoing systems, a charge cable connects to a first charge port assembly of the electrified vehicle and a second charge port assembly of the electrified recreational vehicle during the bidirectional energy transfer event.

In a further non-limiting embodiment of any of the foregoing systems, the control module is further programmed to interface with a bidirectional power transfer system of at least one of the electrified vehicle and the electrified recreational vehicle for controlling the transfer of energy between the electrified vehicle and the electrified recreational vehicle.

In a further non-limiting embodiment of any of the foregoing systems, the control module is a component of the electrified vehicle.

In a further non-limiting embodiment of any of the foregoing systems, the control module is further programmed to communicate a charging details request signal to the electrified recreational vehicle.

In a further non-limiting embodiment of any of the foregoing systems, the control module is further programmed to receive a charging profile from the electrified recreational vehicle.

In a further non-limiting embodiment of any of the foregoing systems, the control module is further programmed to command an alert system of the electrified vehicle to emit audible instructions for guiding a connection of the electrified vehicle to the electrified recreational vehicle prior to performing the bidirectional energy transfer event.

In a further non-limiting embodiment of any of the foregoing systems, the control module is further programmed to command an end to the transfer of energy in response to exceeding a predefined threshold.

In a further non-limiting embodiment of any of the foregoing systems, a human machine interface or a personal electronic device is associated with the electrified vehicle. The human machine interface, the personal electronic device, or both is configured through a cloud-based application to provide a user interface for modifying at least one charge setting associated with the bidirectional energy transfer event.

In a further non-limiting embodiment of any of the foregoing systems, the at least one charge setting includes a charging transfer direction, an alarm setting, a timer setting, a transfer speed setting, a state of charge (SOC) percentage setting, or a donor range setting.

In a further non-limiting embodiment of any of the foregoing systems, the user interface includes a selectable field configured to allow a user to change a direction of energy flow during the bidirectional energy transfer event.

In a further non-limiting embodiment of any of the foregoing systems, the electrified vehicle is a pickup truck, and the electrified recreational vehicle is an all-terrain vehicle, a utility vehicle, a motorcycle, or a snowmobile.

An electrified vehicle according to another exemplary aspect of the present disclosure includes, among other things, a traction battery pack, a bidirectional power transfer system operably connected to the traction battery pack, and a control module programmed to control the bidirectional power transfer system to either receive power for charging the traction battery pack or send power from the traction battery pack to a device separate from the electrified vehicle during a bidirectional energy transfer event.

In a further non-limiting embodiment of the foregoing electrified vehicle, the control module is further programmed to communicate a charging details request signal to an electrified recreational vehicle and is further programmed to receive a charging profile from the electrified recreational vehicle.

In a further non-limiting embodiment of either of the foregoing electrified vehicles, a telecommunications module is configured for establishing bidirectional communications between the electrified vehicle and the electrified recreational vehicle.

In a further non-limiting embodiment of any of the foregoing electrified vehicles, the control module is further programmed to control a transfer of energy from the electrified vehicle to one or more electrified recreational vehicles or from the one or more electrified recreational vehicles to the electrified vehicle during the bidirectional energy transfer event.

In a further non-limiting embodiment of any of the foregoing electrified vehicles, the control module is further programmed to command an end to the transfer of energy in response to exceeding a predefined threshold.

In a further non-limiting embodiment of any of the foregoing electrified vehicles, the vehicles include a human machine interface or a personal electronic device. The human machine interface, the personal electronic device, or both is configured through a cloud-based application to provide a user interface for modifying at least one charge setting associated with the bidirectional energy transfer event.

In a further non-limiting embodiment of any of the foregoing electrified vehicles, the user interface includes a selectable field configured to allow a user to change a direction of energy flow during the bidirectional energy transfer event.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and executing bidirectional energy transfer events between electrified vehicles and one or more participating electrified recreational vehicles. Energy may be transferred from an electrified vehicle to one or more electrified recreational vehicles, from the one or more electrified recreational vehicles to the electrified vehicle, or both during the bidirectional energy transfer events. The proposed systems and methods may further be configured to provide various charging configurations between the electrified vehicle and the one or more electrified recreational vehicles. These and other features of this disclosure are discussed in greater detail in the following paragraphs of this detailed description.

Figure 1:
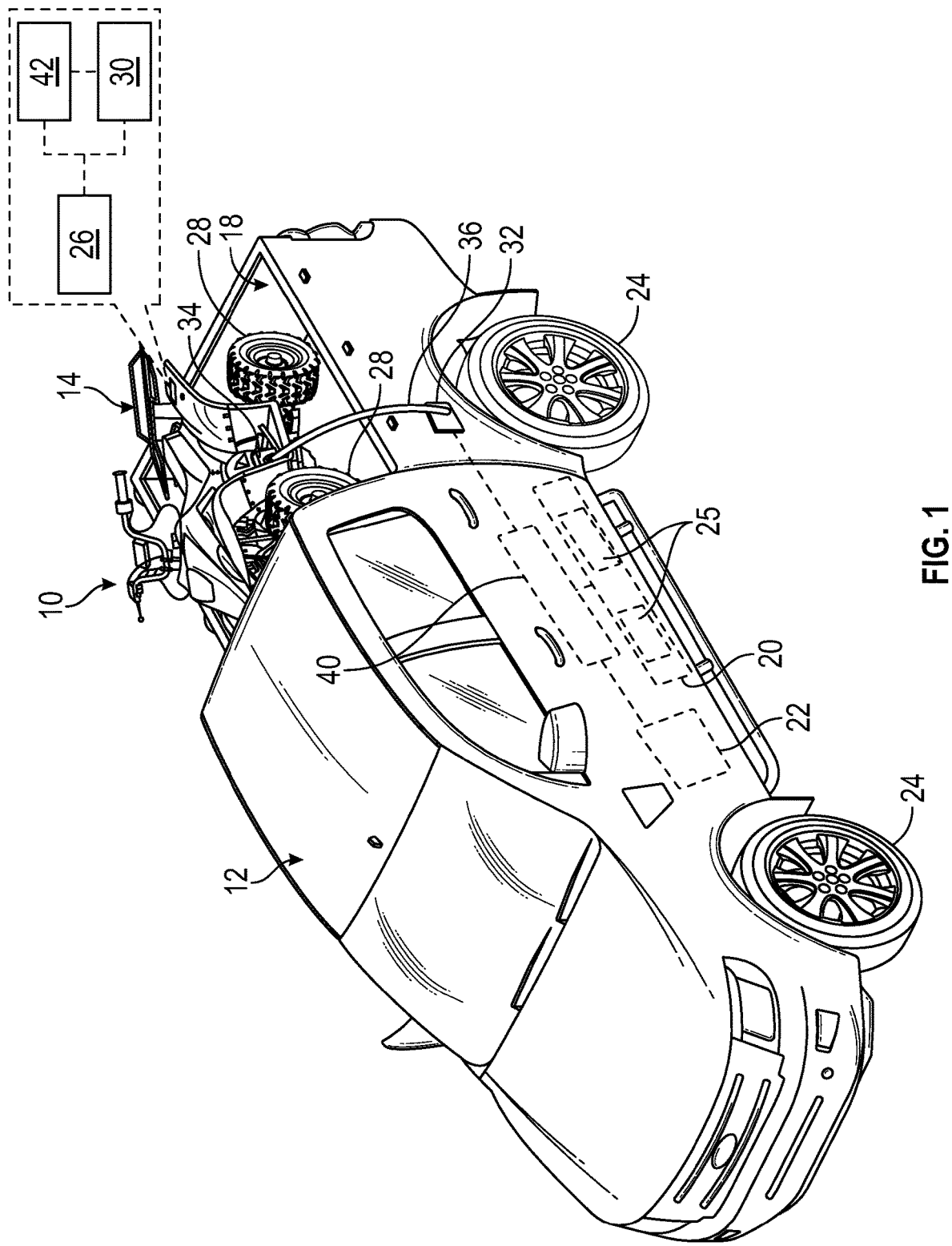
FIG. 1 schematically illustrates an exemplary vehicle-to-recreational vehicle energy transfer system.

FIG. 1 schematically illustrates an exemplary vehicle-to-recreational vehicle (V2RV) energy transfer system 10 (hereinafter "the system 10") for bidirectionally transferring energy between a towing or leading electrified vehicle 12 and a towed or trailing electrified recreational vehicle 14. Energy may be bidirectionally transferred between the electrified vehicle 12 and the electrified recreational vehicle 14 either while the vehicles are stationary or during "in-flight" situations. In this disclosure, the term "in-flight" means during the coupled movement of the electrified vehicle 12 and the electrified recreational vehicle 14, such as when the electrified vehicle 12 is hauling or towing the electrified recreational vehicle 14. Accordingly, the system 10 may enable the bidirectional transfer of energy from the electrified vehicle 12 to the electrified recreational vehicle 14 or vice-versa while the respective vehicles are making forward progress toward their desired destinations.

The system 10 may be utilized to achieve bidirectional energy transfers between the electrified vehicle 12 and one or more electrified recreational vehicles 14. Thus, although a single electrified recreational vehicle 14 is illustrated in FIG. 1, this disclosure is not limited to that specific configuration.

In an embodiment, the electrified recreational vehicle 14 may be positioned within a cargo space 18 (e.g., a truck bed, etc.) of the electrified vehicle 12 during the bidirectional energy transfer event. In another embodiment, the electrified recreational vehicle 14 may be positioned within a towing trailer 16 that is releasably coupled to the electrified vehicle 12 during the bidirectional energy transfer event (see, e.g., FIG. 2). The specific configuration of the towing trailer 16 is not intended to limit this disclosure. In yet another embodiment, the electrified recreational vehicle 14 may simply be parked adjacent to the electrified vehicle 12 during the bidirectional energy transfer event.

The electrified vehicle 12 of FIG. 1 is schematically illustrated as a pickup truck. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

The electrified recreational vehicle 14 of FIG. 1 is schematically illustrated as a four-wheeled all-terrain vehicle (ATV). However, other recreational vehicle configurations are also contemplated. The teachings of this disclosure may be applicable for any type of recreational vehicle. For example, the electrified recreational vehicle 14 could be any type of ATV, utility vehicle (UTV), motorcycle, bike, dirt bike, snowmobile, off-road vehicle, etc.

In an embodiment, the electrified vehicle 12 is a plug-in type electrified vehicle (e.g., a plug-in hybrid electric vehicle (PHEV) or a battery electric vehicles (BEV)). The electrified vehicle 12 may include an electrified powertrain capable of applying a torque from an electric machine 22 (e.g., an electric motor) for driving one or more drive wheels 24 of the electrified vehicle 12. The electrified vehicle 12 may include a traction battery pack 20 for powering the electric machine 22 and other electrical loads of the electrified vehicle 12. The powertrain of the electrified vehicle 12 may electrically propel the drive wheels 24 either with or without the assistance of an internal combustion engine.

In an embodiment, the electrified recreational vehicle 14 is an all-electric recreational vehicle having an electrified powertrain capable of applying torque from an electric machine 26 (e.g., an electric motor) for driving one or more drive wheels 28 of the electrified recreational vehicle 14. The electrified recreational vehicle 14 may include a traction battery pack 30 for powering the electric machine 26. The powertrain of the electrified recreational vehicle 14 may electrically propel the drive wheels 28 without the assistance of an internal combustion engine.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

Although shown schematically, the traction battery pack 20 may be configured as a high voltage traction battery pack that includes a plurality of battery arrays 25 (i.e., battery assemblies or groupings of battery cells) capable of outputting electrical power to the electric machine 22 of the electrified vehicle 12. Other types of energy storage devices and/or output devices may also be used to electrically power the electrified vehicle 12.

The traction battery pack 30 of the electrified recreational vehicle 14 may be a removable high voltage traction battery that includes a plurality of battery cells or groupings of battery cells. In an embodiment, the traction battery pack 30 is a removable traction battery that may be swapped out and replaced with another traction battery.

In general, the traction battery pack 30 of the electrified recreational vehicle 14 is a smaller battery than the traction battery pack 20 of the electrified vehicle 12. However, both batteries are capable of supplying high voltage power for electrically propelling the electrified vehicle 12 or the electrified recreational vehicle 14.

From time to time, charging the energy storage devices of the traction battery pack 20 of the electrified vehicle 12 and/or and the traction battery pack 30 of the electrified recreational vehicle 14 may be required or desirable. Each vehicle 12, 14 may therefore be equipped with a charging system. The charging system of the electrified vehicle 12 may include a charge port assembly 32, and the charging system of the electrified recreational vehicle 14 may include a charge port assembly 34. A charge cable 36 (i.e., EVSE) may be connected to each respective charge port assembly 32, 34 in order to transfer charge energy from the traction battery pack 20 of the electrified vehicle 12 to the traction battery pack 30 of the electrified recreational vehicle 14 or from the traction battery pack 30 of the electrified recreational vehicle 14 to the traction battery pack 20 of the electrified vehicle 12. The charge port assemblies 32, 34 and the charge cable 36 may be configured to provide any level of charging (e.g., Level 1 AC charging, Level 2 AC charging, DC charging, etc.).

Figure 2:
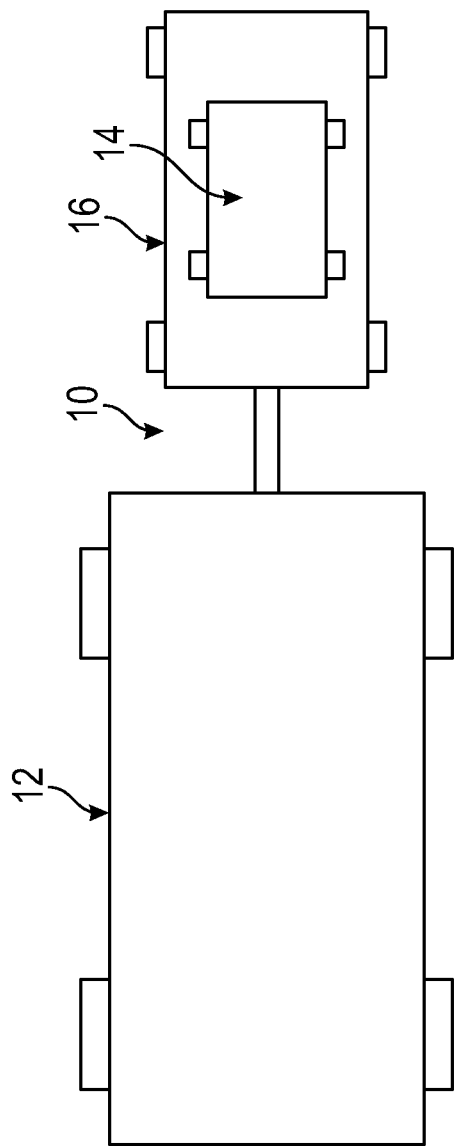
FIG. 2 schematically illustrates an exemplary towing configuration between an electrified vehicle and an electrified recreational vehicle.

The mounting locations of the charge port assemblies 32, 34 are exemplary only and thus not intended to limit this disclosure. In the embodiment of FIGS. 1-2, the charge port assembly 32 of the electrified vehicle 12 is located at the exterior body of the electrified vehicle 12. However, the charge port assembly 32 could alternatively or additionally be provided within the cargo space 18, such as within a wall 38 associated with the cargo space 18 (see, e.g., FIG. 3), for example. Moreover, although only a single charge port assembly for each respective vehicle 12, 14 is shown, the electrified vehicle 12 and/or the electrified recreational vehicle 14 could be equipped with one or more additional charging interfaces, with each charging interface including one or more ports for connecting one or more charge cables.

The charging system of the electrified vehicle 12 may additionally include a bidirectional power transfer system 40, and the charging system of the electrified recreational vehicle 14 may additionally include a bidirectional power transfer system 42. The bidirectional power transfer systems 40, 42 may be configured for enabling the bidirectional transfer of power between the vehicles 12, 14.

The bidirectional power transfer system 40 may be operably connected between the charge port assembly 32 and the traction battery pack 20 of the electrified vehicle 12. The bidirectional power transfer system 40 may include various equipment, such as a charger, a converter, a motor controller (which may be referred to as an inverter system controller or ISC), etc., arranged and configured to establish the bidirectional transfer of electrical energy between the traction battery pack 20 and another traction battery pack (e.g., the traction battery pack 30). The bidirectional power transfer system 40 may additionally be configured to transfer energy between the traction battery pack 20 and the electric machine 22.

The bidirectional power transfer system 42 may be operably connected between the charge port assembly 34 and the traction battery pack 30 of the electrified recreational vehicle 14. The bidirectional power transfer system 42 may include various equipment, such as a charger, a converter, a motor controller (which may be referred to as an inverter system controller or ISC), etc., arranged and configured to establish the bidirectional transfer of electrical energy between the traction battery pack 30 and another traction battery pack (e.g., the traction battery pack 20). The bidirectional power transfer system 42 may additionally be configured to transfer energy between the traction battery pack 30 and the electric machine 26.

One non-limiting example of a suitable bidirectional power transfer system that may be employed for use within the electrified vehicle 12 and/or the electrified recreational vehicle 14 for achieving bidirectional power transfer is disclosed within U.S. Patent Publication No. 2020/0324665, assigned to Ford Global Technologies, LLC, the disclosure of which is herein incorporated by reference. However, other bidirectional power transfer systems could also be utilized for achieving the bidirectional transfer of power within the scope of this disclosure.

Figure 3:
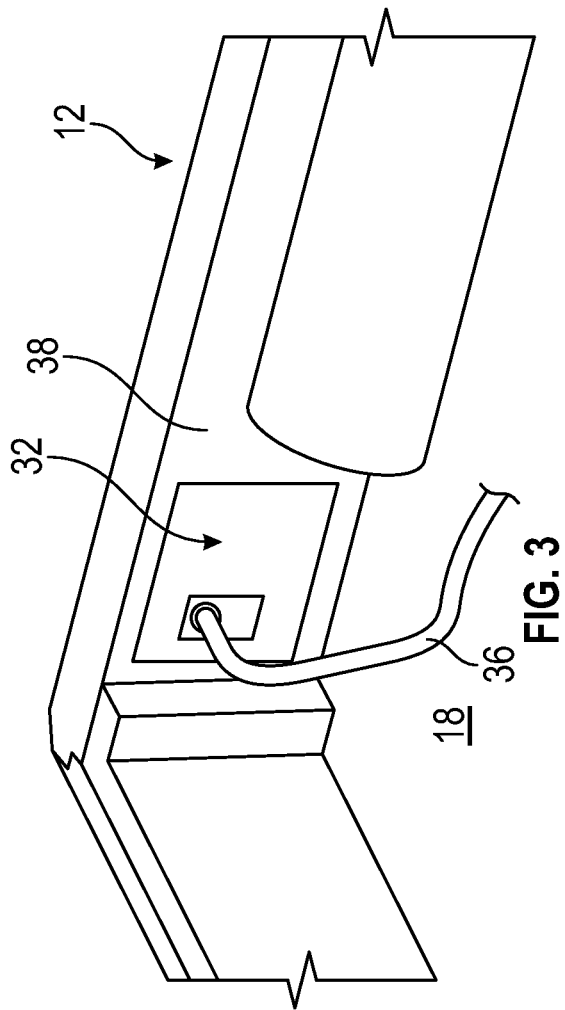
FIG. 3 illustrates an exemplary charge port location for an electrified vehicle equipped to perform a vehicle-to-recreational vehicle bidirectional energy transfer.
Figure 4:
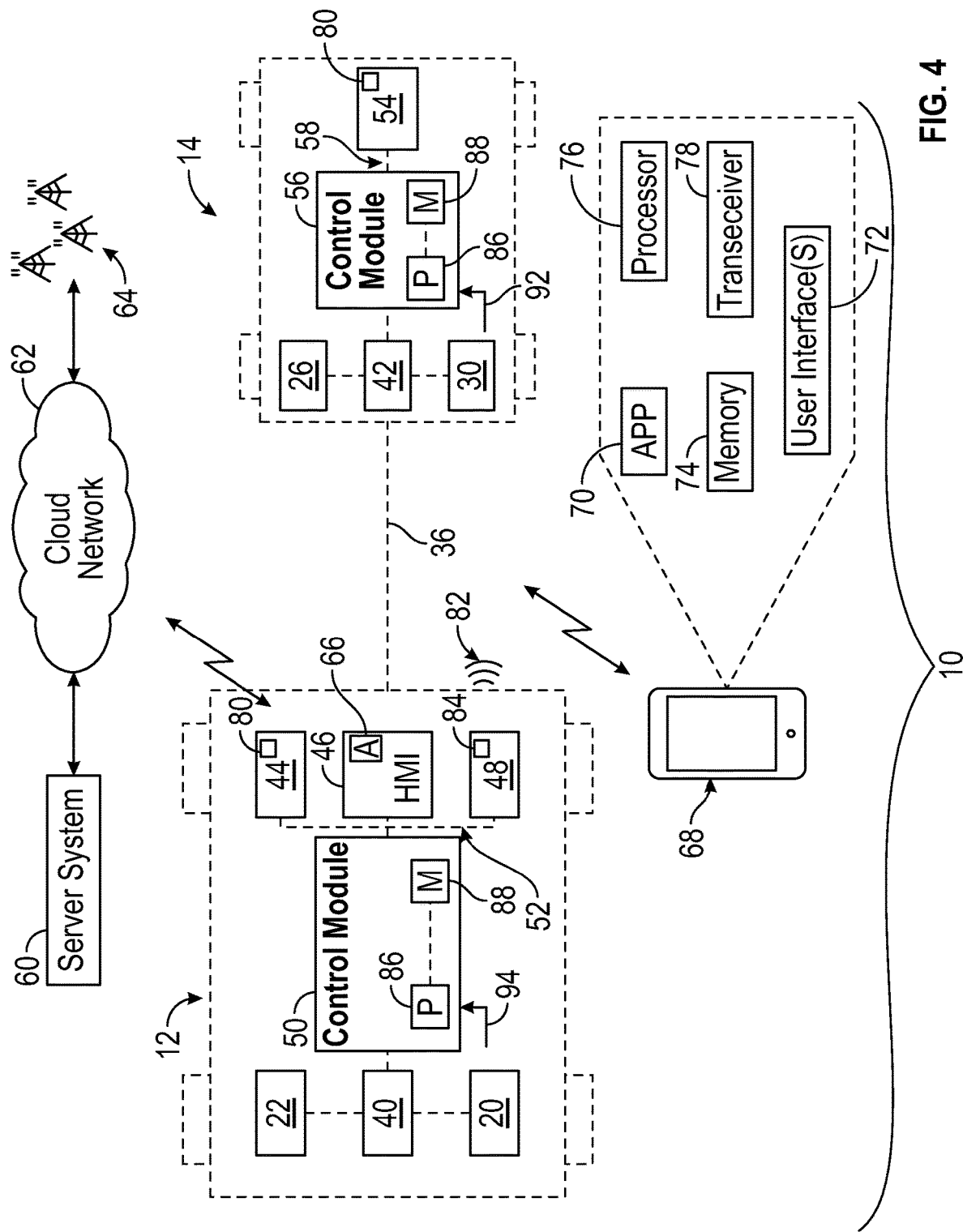
FIG. 4 schematically illustrates exemplary aspects of a vehicle-to-recreational vehicle energy transfer system.

Additional functionality of the system 10 of FIGS. 1-3 is schematically detailed in FIG. 4. In particular, FIG. 4 schematically illustrates features that enable the system 10 to coordinate and achieve multiple different charging configurations for bidirectionally transferring energy between the electrified vehicle 12 and one or more electrified recreational vehicles 14.

In an embodiment, the system 10 includes components from both the electrified vehicle 12 and the electrified recreational vehicle 14. For example, the electrified vehicle 12 may include, among other things, a telecommunications module 44, a human machine interface (HMI) 46, alert system 48, and a control module 50. These components may be interconnected and in electronic communication with one another over a communication bus 52. The communication bus 52 may be a wired communication bus such as a controller area network (CAN) bus, or a wireless communication bus such as Wi-Fi, Bluetooth®, Ultra-Wide Band (UWB), etc.

As further part of the system 10, the electrified recreational vehicle 14 may include, among other things, a telecommunications module 54 and a control module 56. These components may be interconnected and in electronic communication with one another over a communication bus 58. The communication bus 58 may be a wired communication bus such as a controller area network (CAN) bus, or a wireless communication bus such as Wi-Fi, Bluetooth®, Ultra-Wide Band (UWB), etc.

The telecommunications modules 44, 54 may be configured for achieving bidirectional communication between the electrified vehicle 12 and the electrified recreational vehicle 14 over a cloud-based server system 60, such as for scheduling and executing bidirectional energy transfers. Each telecommunications module 44, 54 may communicate over a cloud network 62 (i.e., the internet) to obtain various information stored on the server system 60 or to provide information to the server system 60 that can subsequently be accessed by the electrified vehicle 12 and/or the electrified recreational vehicle 14 (and/or other participating vehicles). The server system 60 can identify, collect, and store user data associated with both the electrified vehicle 12 and the electrified recreational vehicle 14 for validation purposes. Upon an authorized request, data may be subsequently transmitted to the telecommunications modules 44, 54 via one or more cellular towers 64 or via some other known communication technique (e.g., Wi-Fi, Bluetooth®, data connectivity, etc.). The information can then be communicated to the control module 50 and/or the control module 56 for further processing. Each telecommunications module 44, 54 can receive data from the server system 60 or communicate data back to the server system 60 via the cellular tower(s) 64. Although not necessarily shown or described in this highly schematic embodiment, numerous other components may enable bidirectional communication between the vehicles 12, 14 via the server system 60.

In an embodiment, a user/owner of the electrified vehicle 12 and/or the electrified recreational vehicle 14 may interface with the server system 60 using the HMI 46. For example, the HMI 46 may be equipped with an application 66 (e.g., FordPass™ or another similar software application) for interfacing with the server system 60. The HMI 46 may be located within a passenger cabin of the electrified vehicle 12 and may include various user interfaces for displaying information to the vehicle occupants and for allowing the vehicle occupants to enter information into the HMI 46. The vehicle occupants may interact with the user interfaces presentable on the HMI 46 via touch screens, tactile buttons, audible speech, speech synthesis, etc.

In another embodiment, the user/owner of the electrified vehicle 12 and/or the electrified recreational vehicle 14 may alternatively or additionally interface with the server system 60 using a personal electronic device 68 (e.g., a smart phone, tablet, computer, wearable smart device, etc.). The personal electronic device 68 may include an application 70 (e.g., FordPass™ or another similar software application) that includes programming to allow the user to employ one or more user interfaces 72 for setting or controlling certain aspects of the system 10. The application 70 may be stored in memory 74 of the personal electronic device 68 and may be executed by a processor 76 of the personal electronic device 68. The personal electronic device 68 may additionally include a transceiver 78 that is configured to communicate with the server system 60 over the cellular tower(s) 64 or some other wireless link.

Each telecommunications module 44, 54 may additionally include one or more wireless devices 80 that facilitate the detection of and communication with nearby devices or vehicles, such as the electrified vehicle 12 or the electrified recreational vehicle 14, for example. Various information may be exchanged between the electrified vehicle 12 and the electrified recreational vehicle 14 via the wireless devices 80.

In an embodiment, the wireless devices 80 are Bluetooth® Low Energy (BLE) transceivers configured to receive and/or emit low energy signals as a way to detect and communicate with participating vehicles of the system 10. However, other types of wireless devices (e.g., WiFi, V2V, etc.) are also contemplated within the scope of this disclosure for enabling bidirectional communications between the electrified vehicle 12 and one or more electrified recreational vehicles 14.

The alert system 48 is configured to selectively produce and broadcast audible instructions 82 for providing guidance to users of the system 10 once the vehicles 12, 14 are within close proximity to one another for preparing for an impending bidirectional charging event. For example, the alert system 48 may produce the audible instructions 82 for linking the charge cable 36 between the participating vehicles 12, 14 of the system 10. The alert system 48 may include one or more audio actuators 84 (e.g., speakers, sound exciters, etc.) adapted for broadcasting the audible instructions 82. Visual guidance at the HMI 46 and/or the personal electronic device 68 may alternatively or additionally be provided for guiding the users prior to, during, and/or after the bidirectional charging event.

The control modules 50, 56 may each include both hardware and software and could be part of an overall vehicle control system, such as a vehicle system controller (VSC), or could alternatively be a stand-alone controller separate from the VSC. In an embodiment, each control module 50, 56 is programmed with executable instructions for interfacing with and commanding operation of various components of the system 10. Although shown as separate modules within the highly schematic depiction of FIG. 4, the telecommunications module 44, the HMI 46, and the control module 50 could be integrated together as part of common module within the electrified vehicle 12, and the telecommunications module 54 and the control module 56 could be integrated together as part of a common module within the electrified recreational vehicle 14.

Each control module 50, 56 may include a processor 86 and non-transitory memory 88 for executing various control strategies and modes associated with the system 10. The processors 86 can be custom made or commercially available processors, central processing units (CPUs), or generally any device for executing software instructions. The memory 88 can include any one or combination of volatile memory elements and/or nonvolatile memory elements.

The processor 86 may be operably coupled to the memory 88 and may be configured to execute one or more programs stored in the memory 88 of each control module 50, 56 based on the various inputs received from other devices. In an embodiment, the application 66, which includes programming for allowing the vehicle user to employ one or more user interfaces within the HMI 46 for setting or controlling certain aspects of the system 10, may be stored in the memory 88 and may be executed by the processor 86 of the control module 50. In another embodiment, the control module 50 and/or the control module 56 may be configured to communicate and interface with the personal electronic device 68 for coordinating and/or executing certain aspects of the system 10.

In an embodiment, when a bidirectional energy transfer event is selected at either the HMI 46 or the personal electronic device 68 or is otherwise desired, the control module 50 of the electrified vehicle 12 may command the telecommunications module 44 to search for electrified recreational vehicles 14 located within a predefined range (e.g., less than or equal to about 100 feet) of the electrified vehicle 12. The telecommunications module 44 may communicate with the telecommunications module 54 of nearby electrified recreational vehicles 14 via the wireless devices 80. In an embodiment, the wireless device 80 of the telecommunications module 44 searches for and locates nearby electrified recreational vehicles 14 using BLE triangulation techniques. However, other techniques are also contemplated within the scope of this disclosure.

Once detected, a map 90 (see FIG. 5A) of potential participating electrified recreational vehicles 14 relative to the electrified vehicle 12 may be displayed on a user interface associated with either the HMI 46, the personal electronic device 68, or both. Using the map 90, the user may select one or more of the electrified recreational vehicles 14 that are to participate in the bidirectional energy transfer event.

In another embodiment, the control module 50 of the electrified vehicle 12 may communicate (e.g., via the telecommunications modules 44, 54) a charging details request signal 92 to the control module 56 of the electrified recreational vehicle 14 (and/or to any other recreational vehicle selected via the map 90). The charging details request signal 92 my request details related to the traction battery pack 30 of the electrified recreational vehicle 14, including but not limited to, battery size, state of charge, recommended charging rate, current battery temperature, recommended battery temperature range, vehicle range (e.g., in miles or operating time per unit of kilowatt-hours), typical battery temperature increase during fast charging versus ambient temperature, charge acceptance at current temperature, battery health data, etc.

In response to receiving the charging details request signal 92, the control module 56 of the electrified recreational vehicle 14 may communicate a charging profile 94 to the control module 50 of the electrified vehicle 12. The charging profile 94 includes the details requested within the charging details request signal 92. The charging profile 94 may be used by the control module 50 for determining how to configure the bidirectional power transfer system 40 during a bidirectional energy transfer event. The charging profile 94 may further by used by the control module 50 for communicating with the control module 56 for determining how to configure the bidirectional power transfer system 42 during the bidirectional energy transfer event.

The control module 50 may store the charging profile 94 in the memory 88. The charging profile 94 may be accessed by the control module 94 each time the electrified recreational vehicle 14 is reconnected to the electrified vehicle 12 for bidirectional charging. The charging profile 94 may also be updated with new information each time the electrified recreational vehicle 14 is reconnected to the electrified vehicle 12 for bidirectional charging.

In another embodiment, the control module 50 may be configured to estimate certain charging-related details pertaining to the electrified recreational vehicle 14 when the charging profile 94 is missing or incomplete. The control module 50 may estimate charging related details for a given electrified recreational vehicle 14 based on the stored charging profiles of similar electrified recreational vehicles, for example.

In yet another embodiment, the control module 50 may be configured to suggest a particular charging configuration of the system 10 based on information from the charging profile 94. The suggested charging configuration may be one that is best suited for charging the traction battery pack 30 of the participating electrified recreational vehicle 14.

In another embodiment, the control module 50 may command the alert system 48 to broadcast the audible instructions 82 for guiding the user to connect the charge cable 36 to both the electrified vehicle 12 and the electrified recreational vehicle 14 in preparation for performing bidirectional energy transfer events.

In another embodiment, the control module 50 may interface with and control the functionality of the bidirectional power transfer system 40 for coordinating and commanding a desired charging configuration of the system 10. The control module 50 may also control the wireless device 80 of the telecommunications module 44 for coordinating the desired power transfer with the control module 56 of the electrified recreational vehicle 14. The specific charging configuration commanded by the control module 50 may be predefined by the user, such as by using the HMI 46 or the personal electronic device 68, for example.

The control modules 50, 56 may further coordinate with one another for controlling the bidirectional power transfer systems 40, 42 for ending the bidirectional energy transfer event when a predefined threshold is exceeded. The predefined threshold may be an ambient temperature threshold, a charge acceptance threshold, a customer selected total energy threshold, etc.

In another embodiment, the control module 50 may be configured to estimate the amount of time necessary for achieving a user desired amount of charge within the traction battery pack 30 of the electrified recreational vehicle 14. This estimated amount of time can be compared to a known amount of time required for swapping out the traction battery pack 30 with another traction battery pack. The control module 50 may provide a recommendation to the user within a user interface of either the HMI 46 or the personal electronic device 68 when it would be faster to swap out the traction battery pack 30 to achieve the desired battery charge levels.

Figure 5A:
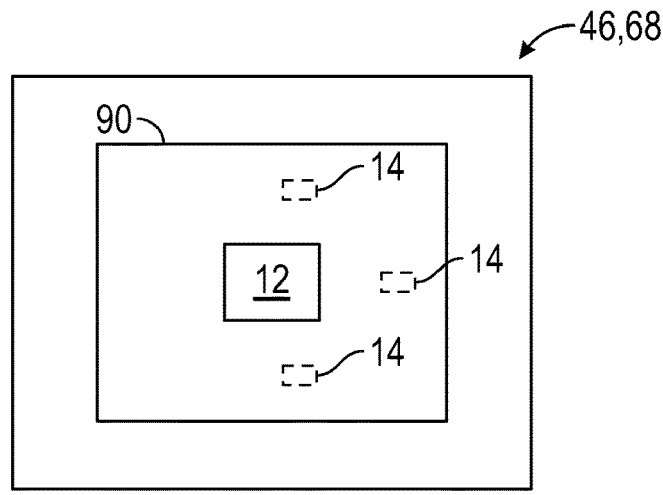
FIG. 5A illustrates an exemplary map that can be presented to a user for coordinating bidirectional charging of a vehicle-to-recreational vehicle energy transfer system.
Figure 5B:
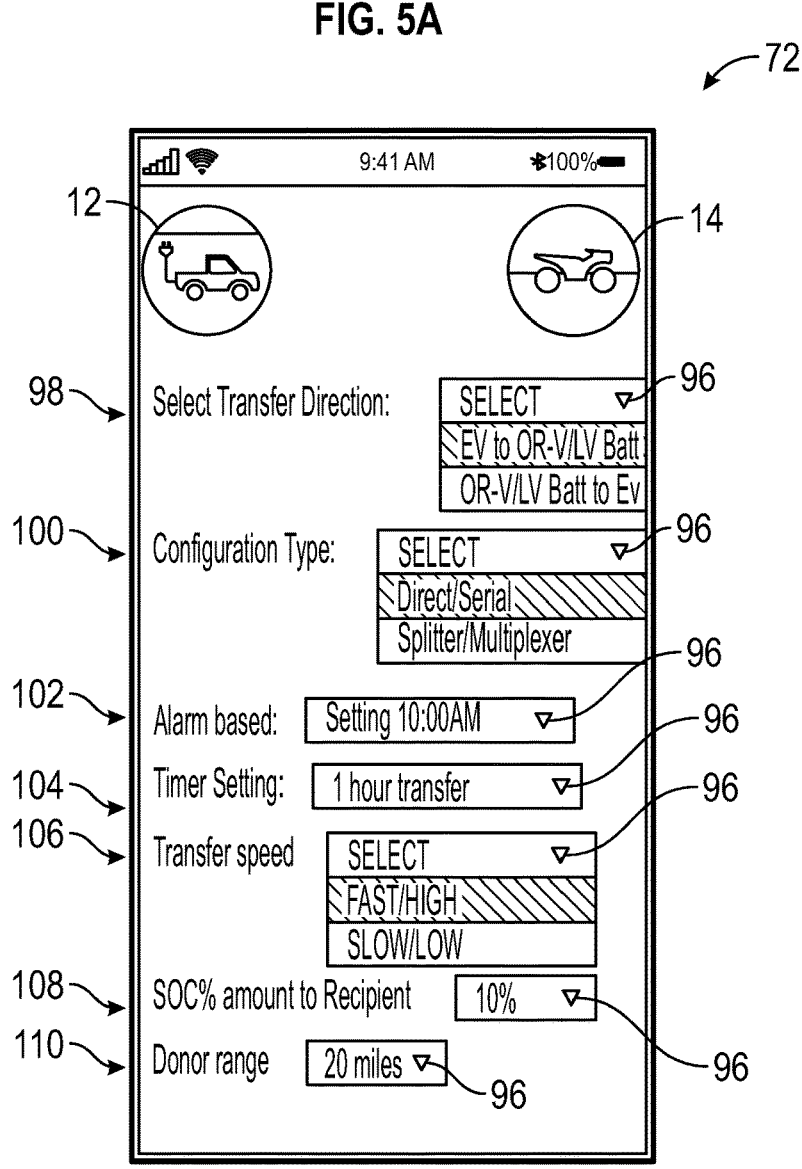
FIG. 5B illustrates an exemplary user interface that can be presented to a user for coordinating bidirectional charging of a vehicle-to-recreational vehicle energy transfer system.

FIG. 5B, with continued reference to FIGS. 1 and 4, illustrates an exemplary user interface 72 that can be presented to a user of the system 10 for coordinating and executing bidirectional charging events between the electrified vehicle 12 and the electrified recreational vehicle 14. The user interface 72 can be presented to the user on the HMI 46, the personal electronic device 68, or both. The user interface 72 may be accessed and utilized by the user for setting and/or adjusting one or more bidirectional charging settings associated with a given bidirectional energy transfer event.

The user interface 72 may include a plurality of drop down menus 96 that allow the user to modify the bidirectional charging settings of the system 10 prior to, during, and/or after a bidirectional energy transfer event. Although shown as drop down menus, the user interface 72 could employ toggles, sliding scales, or any other features or combinations of features that would allow the user to modify the bidirectional charging settings.

A first bidirectional charging setting that may be set or adjusted by the user via the user interface 72 is a transfer direction 98 of the bidirectional energy transfer. The transfer direction 98 indicates whether the energy transfer will occur from the electrified vehicle 12 to the electrified recreational vehicle 14 or vice versa. The transfer direction 98 therefore controls which traction battery pack 20, 30 will be charged during the bidirectional energy transfer event.

A second bidirectional charging setting that may be set or adjusted by the user via the user interface 72 is a charging configuration 100 of the system 10. The charging configuration 100 indicates the manner in which energy is to be transferred during the bidirectional energy transfer event, and could also indicate how the electrified vehicle 12 and the one or more electrified recreational vehicles 14 are connected together for charging. For example, the charging configuration 100 may be set as a direct configuration, serial configuration, splitter configuration, multiplexer configuration, etc. Additional details concerning exemplary charging configurations of the system 10 are provided below.

A third bidirectional charging setting that may be set or adjusted by the user via the user interface 72 is an alarm based setting 102 associated with the bidirectional energy transfer. The alarm based setting 102 may indicate a specific time at which the selected bidirectional energy transfer is to be performed by the system 10. This setting allows energy to be retained and then only transferred when close to being needed, such in anticipation for an upcoming off-roading event, for example.

A fourth bidirectional charging setting that may be set or adjusted by the user via the user interface 72 is a timer setting 104 of the bidirectional energy transfer. The timer setting 104 may indicate a fixed amount of time for which to perform the bidirectional energy transfer. Any amount of time can be set by the user via the timer setting 104.

A fifth bidirectional charging setting that may be set or adjusted by the user via the user interface 72 is a transfer speed setting 106 of the system 10. For example, the user may select a fast/high transfer speed or a slow/low transfer speed for performing the bidirectional energy transfer event via the transfer speed setting 106. Other transfer speed settings may additionally be provided within the scope of this disclosure.

A sixth bidirectional charging setting that may be set or adjusted by the user via the user interface 72 is a state of charge (SOC) percentage setting 108. The SOC percentage setting 108 allows the user to select a specific amount of charge that is to be transferred during the bidirectional energy transfer event.

A seventh bidirectional charging setting that may be set or adjusted by the user via the user interface 72 is a donor range setting 110. The donor range setting 110 allows the user to select a specific amount of range, such as in miles or kilometers, that is to be transferred from one vehicle to another during the bidirectional energy transfer event.

The user selectable bidirectional charging settings offered by the user interface 72 shown in FIG. 5A are exemplary only. Other bidirectional charging settings and related options may additionally or alternatively be provided and used to coordinate functionality of the system 10 within the scope of this disclosure.

Figure 6:
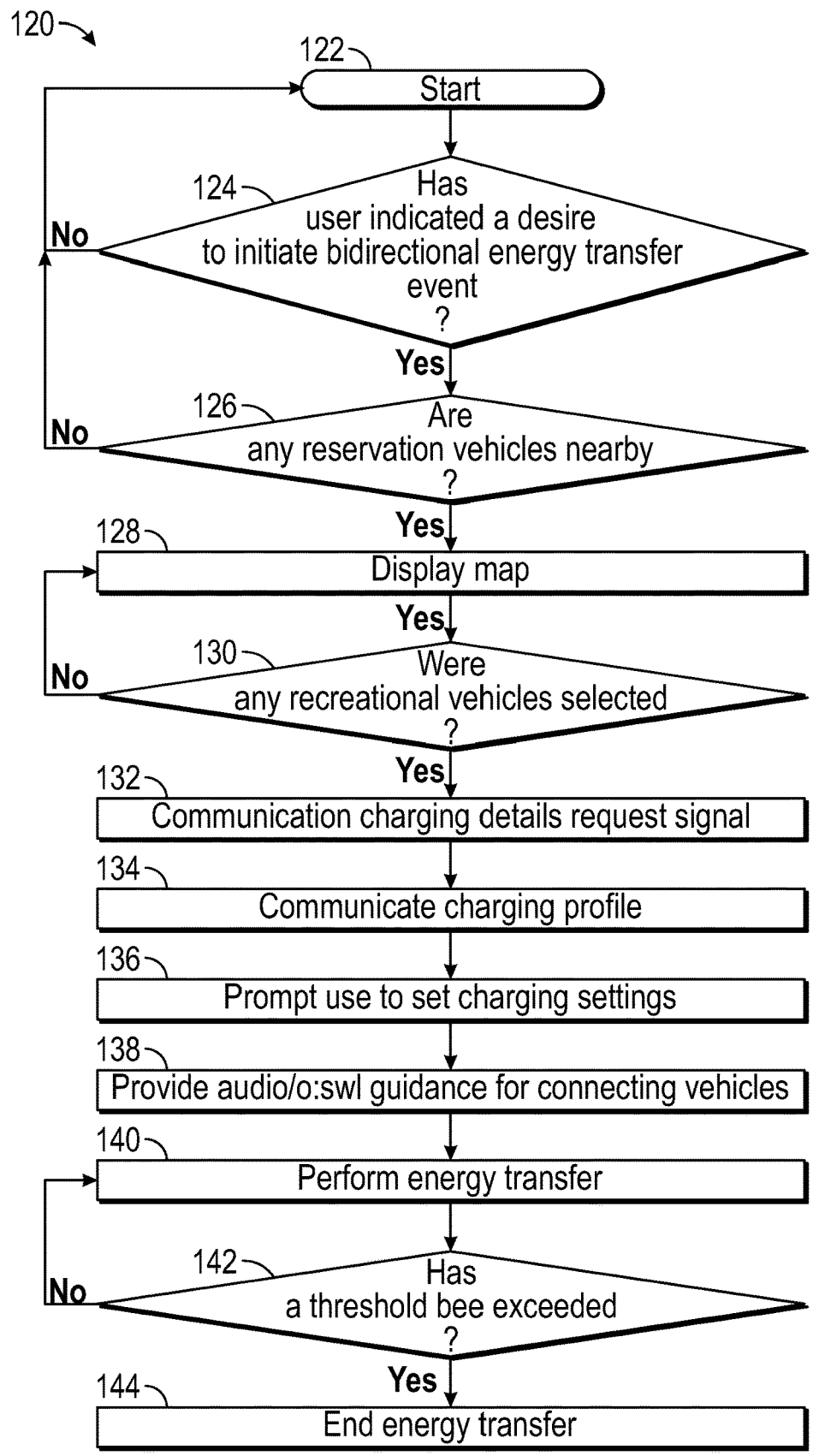
FIG. 6 schematically illustrates an exemplary method for coordinating and executing bidirectional energy transfer events between an electrified vehicle and one or more electrified recreational vehicles.

FIG. 6, with continued reference to FIGS. 1-5B, schematically illustrates, in flow chart form, an exemplary method 120 for coordinating and providing bidirectional energy transfer events between the electrified vehicle 12 and one or more electrified recreational vehicles 14. The system 10 may be configured to employ one or more algorithms adapted to execute the steps of the exemplary method 120. For example, the method 120 may be stored as executable instructions in the memory 88 of the control module 50, and the executable instructions may be embodied within any computer readable medium that can be executed by the processor 86 of the control module 50.

The exemplary method 120 may begin at block 122. At block 124, the method 120 may determine whether a user has indicated a desired to initiate a bidirectional energy transfer event. The user may indicate such a desire by launching the application 66 on the HMI 46 or by launching the application 70 on the personal electronic device 68, for example.

If a YES flag is returned at block 124, the method 120 may proceed to block 126 by determining whether any electrified recreational vehicles 14 are within a predefined range of the electrified vehicle 12. IF YES, the map 90 may be displayed on the HMI 46 or the personal electronic device 68 at block 128.

At block 130, the method 120 determines whether the user has selected one or more electrified recreational vehicles 14 from within the map 90 for participating in the bidirectional energy transfer event. If one or more participating vehicles have been selected, the electrified vehicle 12 may communicate the charging details request signal 92 to the one or more selected electrified recreational vehicles 14 at block 132. In response, the one or more selected electrified recreational vehicles 14 may communicate their respective charging profile 94 to the electrified vehicle 12 at block 134.

Next, at block 136, the method 120 may prompt the user to set the bidirectional charging settings that will be utilized during the bidirectional energy transfer event. In an embodiment, the prompt is achieving by automatically presenting the user interface 72 to the user on either the HMI 46 or the personal electronic device 68. Other prompts may also be utilized.

The method 120 may proceed to block 138 once the bidirectional charging settings have been set by the user. At this step, the method 120 may provide audio and/or visual guidance to the user for connecting the participating vehicles using one or more charge cables 36. Audio guidance may be provided by the alert system 48, and visual guidance may be provided by displaying one or more messages on the HMI 46, the personal electronic device 68, or both.

The bidirectional energy transfer event may be performed per the user selected bidirectional charging settings at block 140. Bidirectional charging may continue until a predefined threshold is exceeded at block 142. The predefined threshold may be an ambient temperature threshold, a charge acceptance threshold, a customer selected total energy threshold, etc. Once any of the predefined thresholds have been exceeded, the method 120 may end at block 144.

The method 120 described above is intended to be exemplary only. A greater or fewer number of steps could be performed for executing bidirectional energy transfer events via the system 10 within the scope of this disclosure.

The system 10 of FIGS. 1-5B may be utilized to achieve various charging configurations between the electrified vehicle 12 and one or more electrified recreational vehicles 14. Non-limiting examples of the types of charging configurations that may be achieved by the system 10 are described below with reference to FIGS. 7-20.

Figure 7:
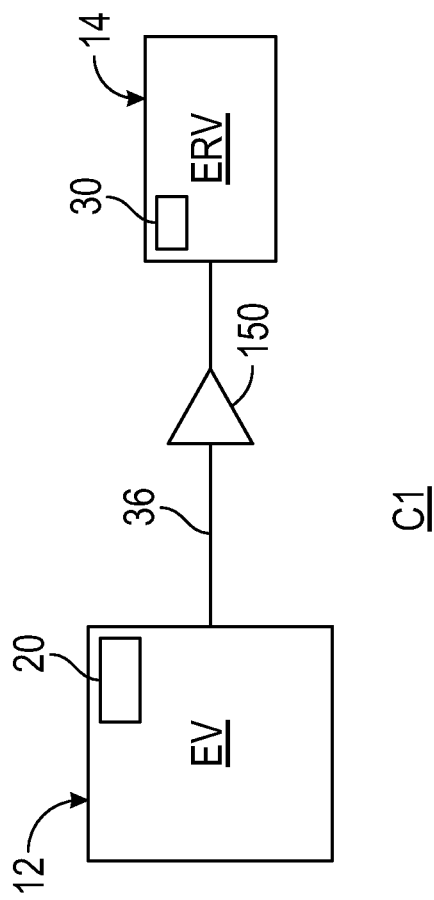
FIG. 7 illustrates a first charging configuration of a vehicle-to-recreational vehicle energy transfer system.

FIG. 7 schematically illustrates a first charging configuration C1 that can be provided by the system 10. During the first charging configuration C1, power may be transferred (e.g., via the charge cable 36) from the traction battery pack 20 of electrified vehicle 12 to the traction battery pack 30 of the electrified recreational vehicle 14 (as schematically depicted by arrow 150).

Figure 8:
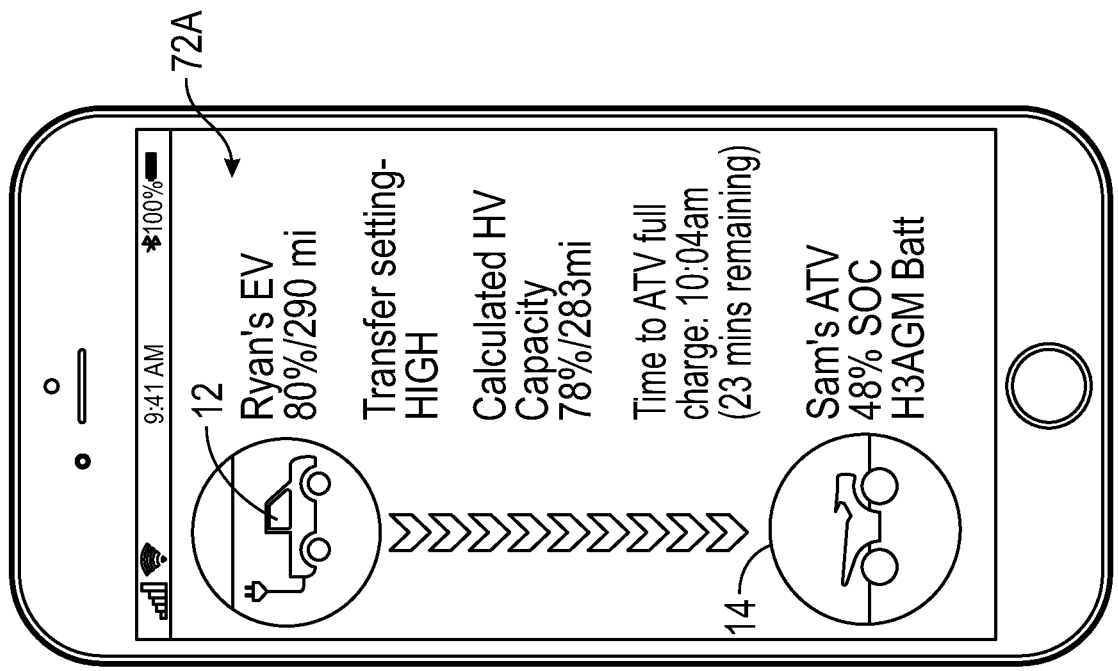
FIG. 8 illustrates an exemplary user interface that can be presented to a user for providing user controls and displaying information related to the first charging configuration of FIG. 7.

FIG. 8 illustrates an exemplary user interface 72A that can be presented on the HMI 46, the personal electronic device 68, or both for providing information to the user during the charging event associated with the first charging configuration C1 of FIG. 7. The user interface 72A may provide various information to the user, such as the SOC percentage and range of the electrified vehicle 12, the SOC percentage of the electrified recreational vehicle 14, transfer setting, calculated battery capacity information, estimated time to full charge, etc.

Figure 9:
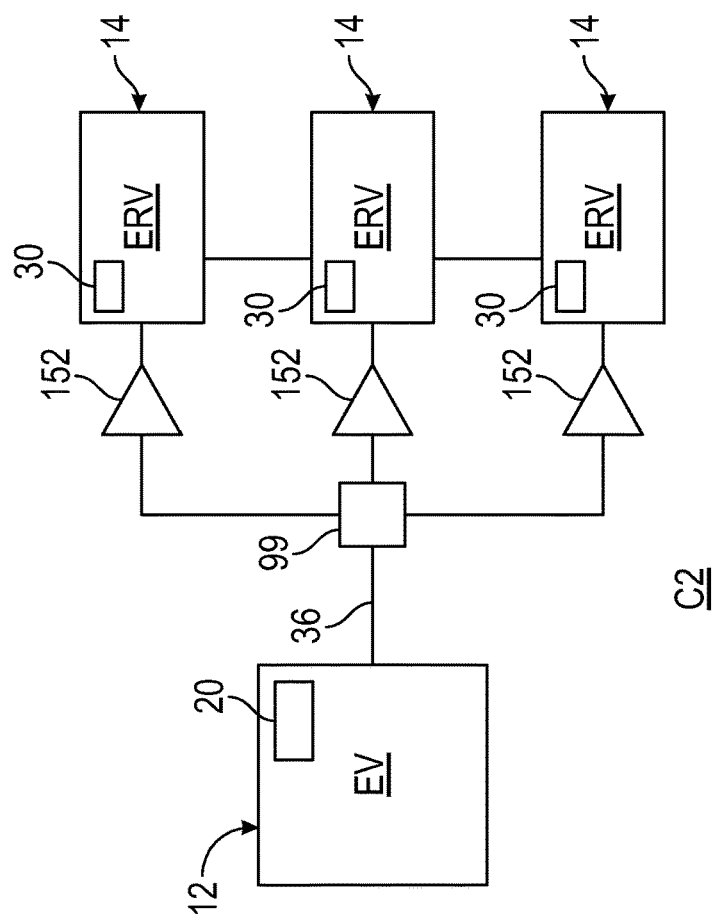
FIG. 9 illustrates a second charging configuration of a vehicle-to-recreational vehicle energy transfer system.

FIG. 9 schematically illustrates a second charging configuration C2 of the system 10. During the second charging configuration C2, power may be transferred from the traction battery pack 20 of electrified vehicle 12 to the traction battery packs 30 associated with multiple participating electrified recreational vehicles 14 (as schematically depicted by arrows 152). The second charging configuration C2 may be referred to as a splitter configuration.

The second charging configuration C2 may be achieved using one or more charge cables 36. If using a single charge cable 36, the charge cable 36 could include a splitter 99 for dividing the power into multiple charge cable legs.

Figure 10:
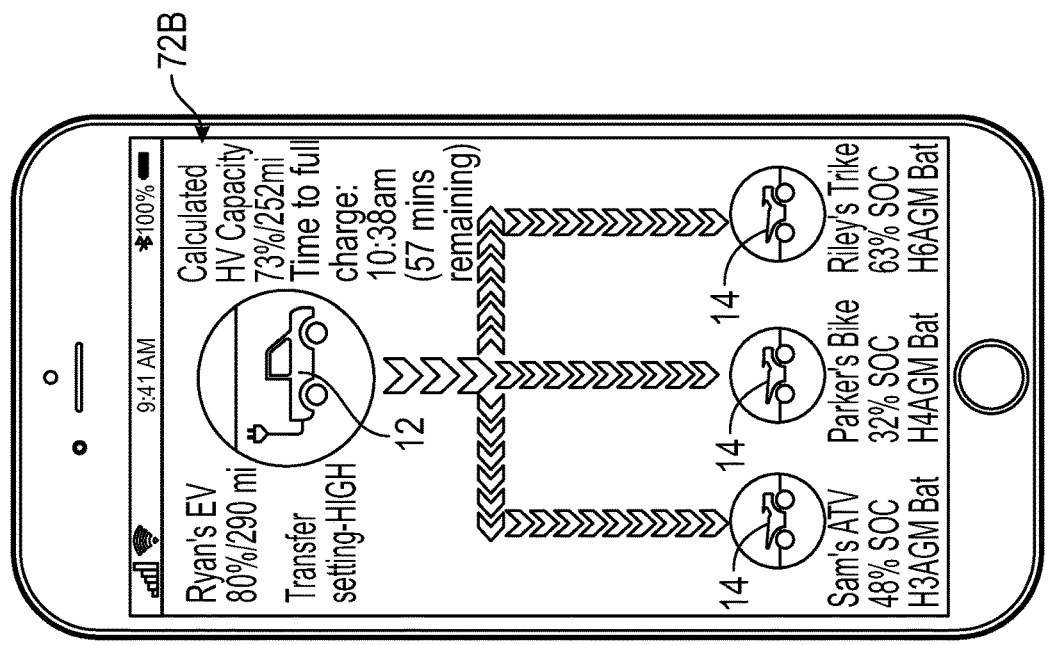
FIG. 10 illustrates an exemplary user interface that can be presented to a user for providing user controls and displaying information related to the second charging configuration of FIG. 9.

FIG. 10 illustrates an exemplary user interface 72B that can be presented on the HMI 46, the personal electronic device 68, or both for providing information to the user during the charging event associated with the second charging configuration C2 of FIG. 9. The user interface 72B may provide various information to the user, such as the SOC percentage and range of the electrified vehicle 12, the SOC percentage of the participating electrified recreational vehicles 14, transfer setting, calculated battery capacity, estimated time to full charge, etc.

Figure 11:
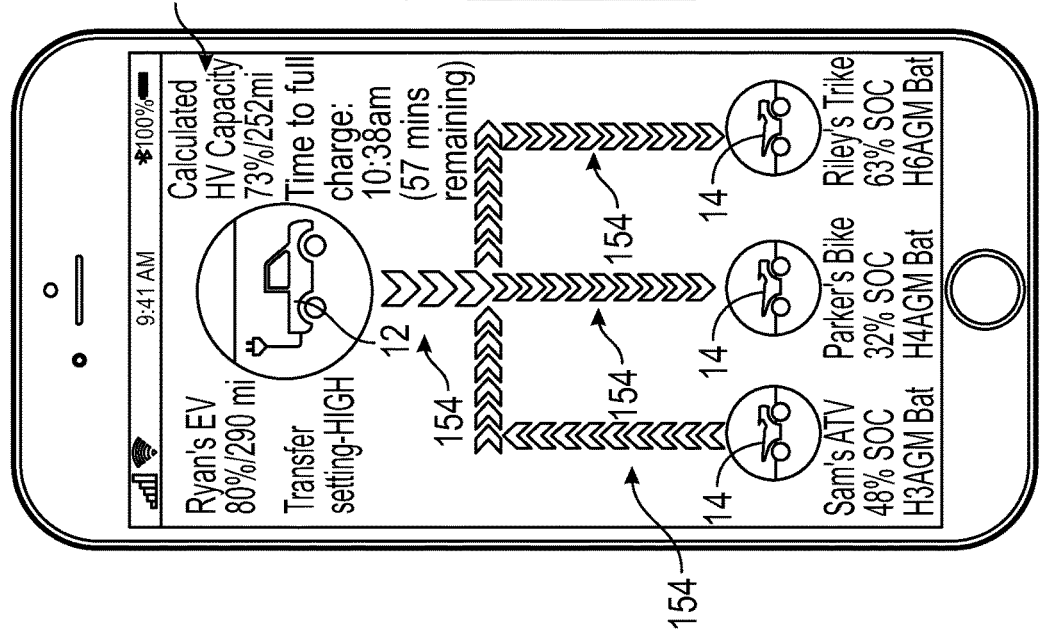
FIG. 11 illustrates another exemplary user interface that can be presented to a user for providing user controls and displaying information related to the second charging configuration of FIG. 9.

FIG. 11 illustrates another exemplary user interface 72C that can be presented for providing information and allowing the user to modify settings associated with the second charging configuration C2 of FIG. 9. The user interface 72C may include selectable fields 154 that may be manipulated by the user to change the direction of energy flow during the bidirectional energy transfer event. For example, the user may manipulate the selectable fields 154 such that a first portion P1 of the participating electrified recreational vehicles 14 receive power from the electrified vehicle 12 and a second portion P2 of the participating electrified recreational vehicles 14 may assist the electrified vehicle 12 in charging the first portion P1 of the participating electrified recreational vehicles 14.

Figure 12:
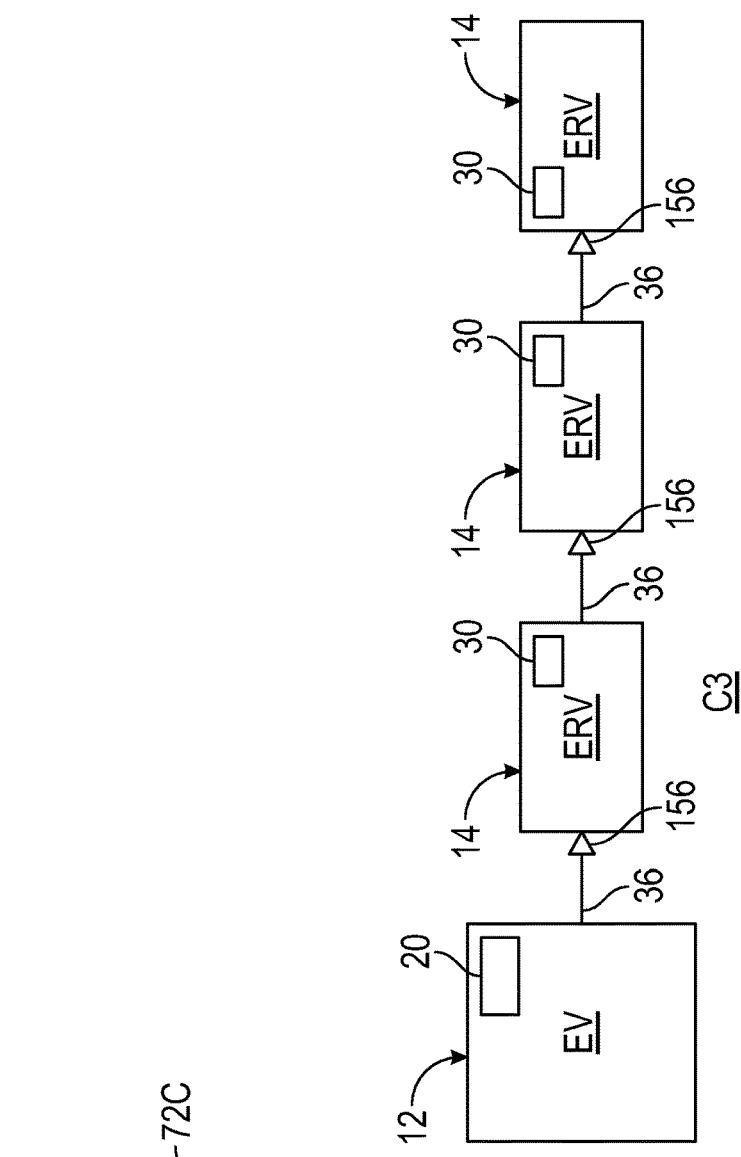
FIG. 12 illustrates a third charging configuration of a vehicle-to-recreational vehicle energy transfer system.

FIG. 12 schematically illustrates a third charging configuration C3 of the system 10. During the third charging configuration C3, power may be transferred from the traction battery pack 20 of electrified vehicle 12 to the traction battery packs 30 associated with multiple participating electrified recreational vehicles 14 (as schematically depicted by arrows 156) in series. The third charging configuration C3 may therefore be referred to as a serial configuration.

Multiple charge cables 36 may be provided for achieving the third charging configuration C3. In an embodiment, the charge cables 36 are arranged in a daisy-chain or pigtail configuration for the third charging configuration C3.

Figure 13:
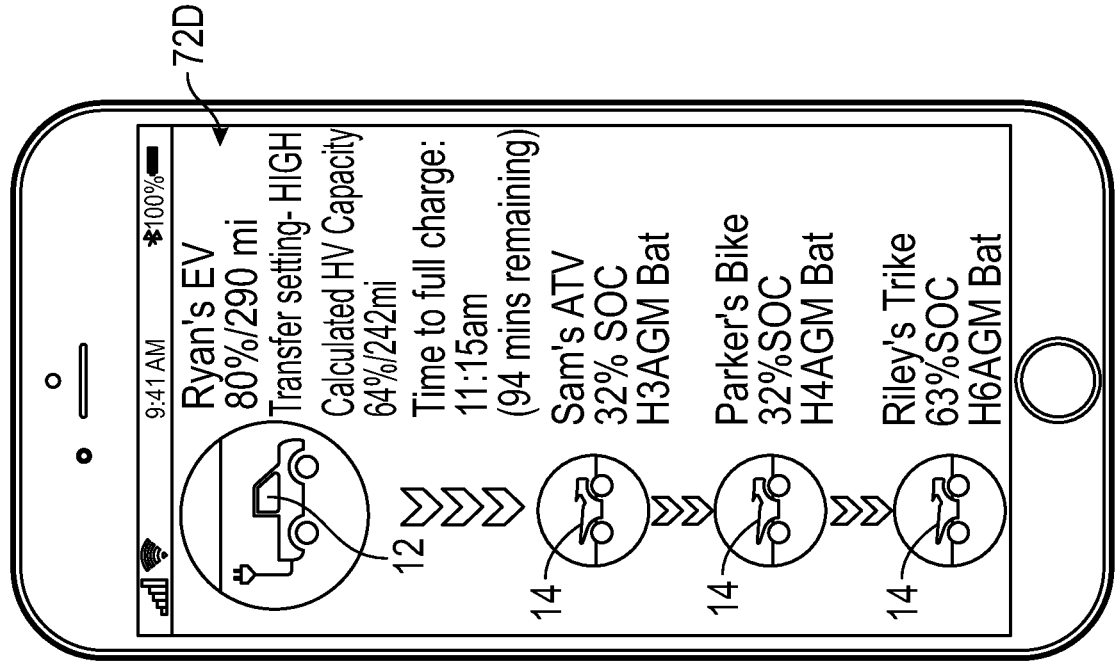
FIG. 13 illustrates an exemplary user interface that can be presented to a user for providing user controls and displaying information related to the third charging configuration of FIG. 12.

FIG. 13 illustrates an exemplary user interface 72D that can be presented on the HMI 46, the personal electronic device 68, or both for providing information to the user during the charging event associated with the third charging configuration C3 of FIG. 12. The user interface 72D may provide various information to the user, such as the SOC percentage and range of the electrified vehicle 12, the SOC percentages of the participating electrified recreational vehicles 14, transfer setting, calculated battery capacity, estimated time to full charge, etc.

Figure 14:
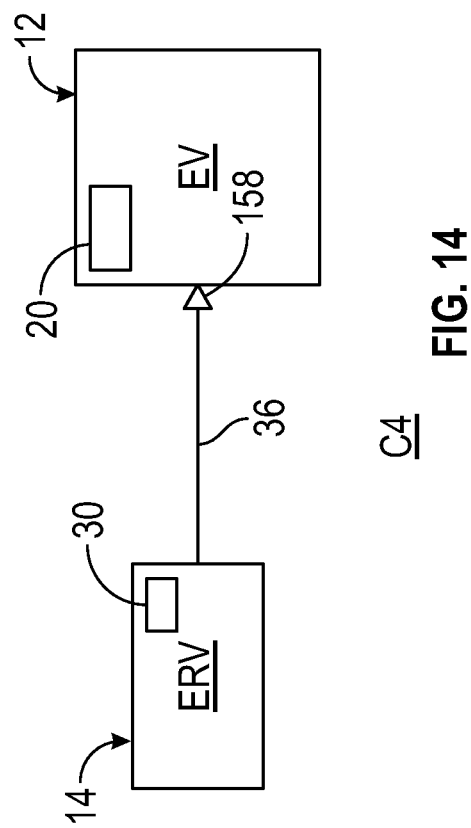
FIG. 14 illustrates a fourth charging configuration of a vehicle-to-recreational vehicle energy transfer system.

FIG. 14 schematically illustrates a fourth charging configuration C4 of the system 10. During the fourth charging configuration C4, power may be transferred from the traction battery pack 30 of the electrified recreational vehicle 14 to the traction battery pack 20 of the electrified vehicle 12 (as schematically illustrated by arrow 158). In this way, the electrified recreational vehicle 14 may periodically charge the electrified vehicle 12 to increase the travel range of the electrified vehicle 12.

Figure 15:
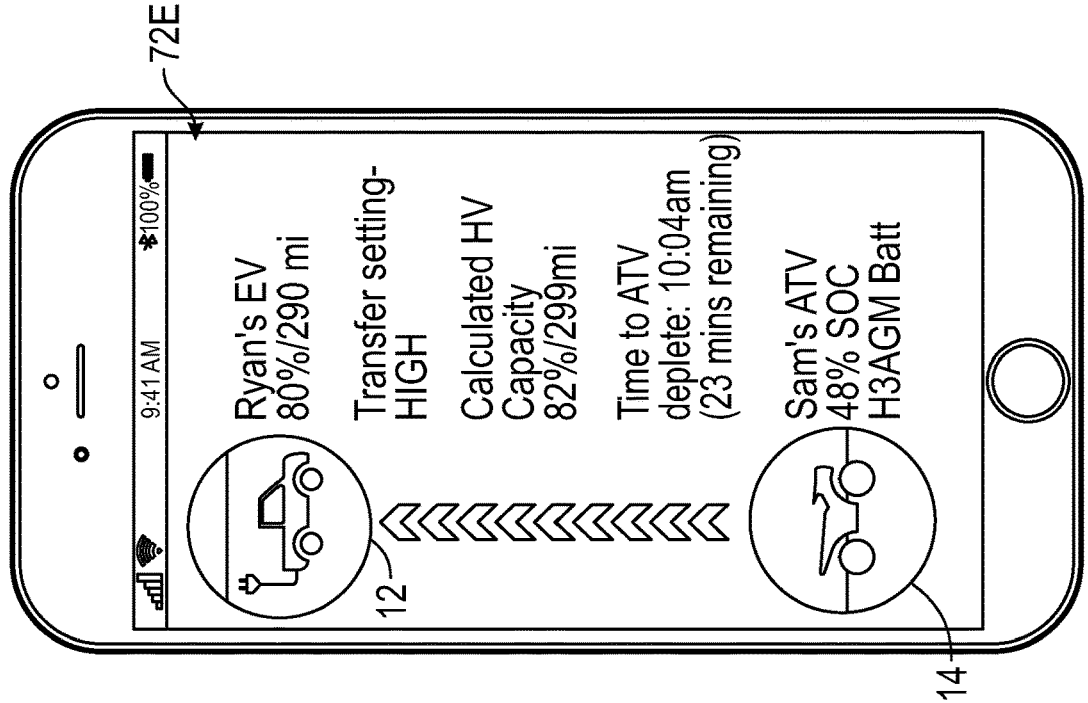
FIG. 15 illustrates an exemplary user interface that can be presented to a user for providing user controls and displaying information related to the fourth charging configuration of FIG. 14.

FIG. 15 illustrates an exemplary user interface 72E that can be presented on the HMI 46, the personal electronic device 68, or both for providing information to the user during the charging event associated with the fourth charging configuration C4 of FIG. 14. The user interface 72E may provide various information to the user, such as the SOC percentage and range of the electrified vehicle 12, the SOC percentage of the participating electrified recreational vehicle 14, transfer setting, calculated battery capacity, estimated time to full charge, etc.

Figure 16:
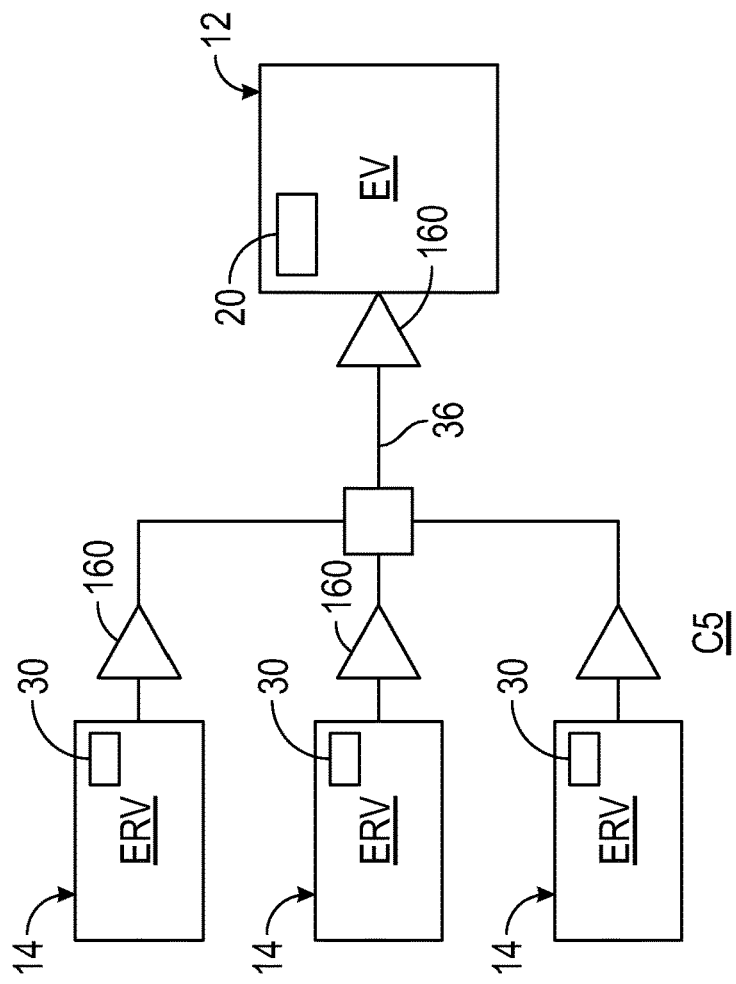
FIG. 16 illustrates a fifth charging configuration of a vehicle-to-recreational vehicle energy transfer system.

FIG. 16 schematically illustrates a fifth charging configuration C5 of the system 10. During the fifth charging configuration C5, power may be transferred from the traction battery packs 30 of multiple participating electrified recreational vehicles 14 to the traction battery pack 20 of the electrified vehicle 12 (as schematically depicted by arrows 160). The fifth charging configuration C5 may be referred to as a multiplexer configuration. The fifth charging configuration C5 may be achieved using one or more charge cables 36.

Figure 17:
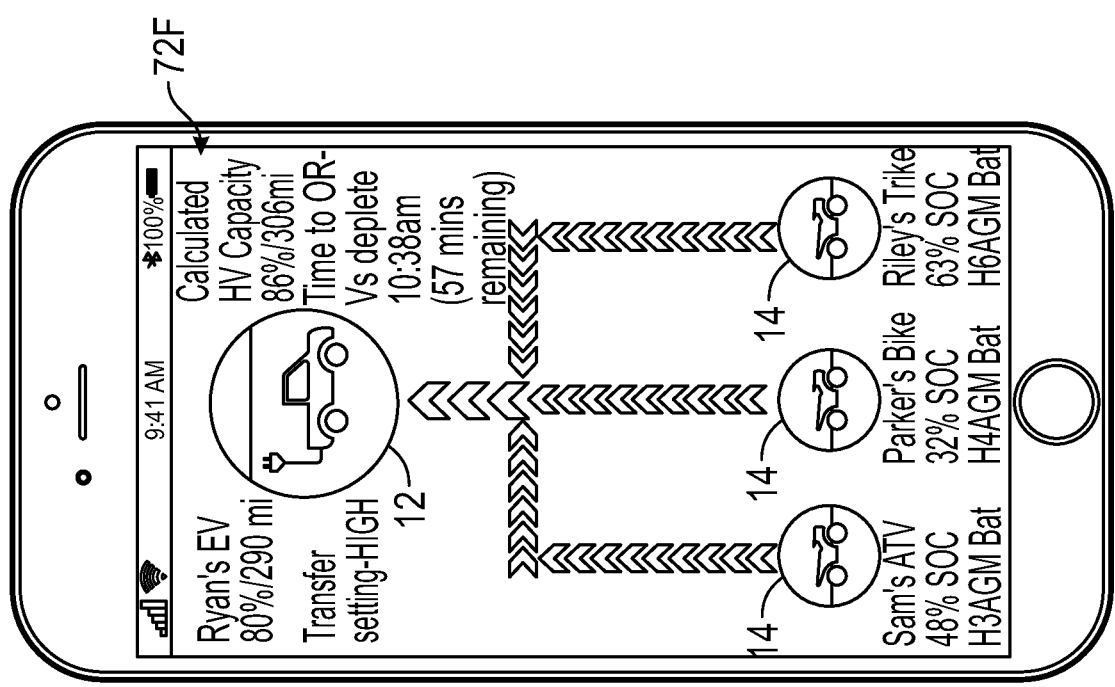
FIG. 17 illustrates an exemplary user interface that can be presented to a user for providing user controls and displaying information related to the fifth charging configuration of FIG. 16.

FIG. 17 illustrates an exemplary user interface 72F that can be presented on the HMI 46, the personal electronic device 68, or both for providing information to the user during the charging event associated with the fifth charging configuration C5 of FIG. 16. The user interface 72F may provide various information to the user, such as the SOC percentage and range of the electrified vehicle 12, the SOC percentages of the participating electrified recreational vehicles 14, transfer setting, calculated battery capacity, estimated time to full charge, etc.

Figure 18:
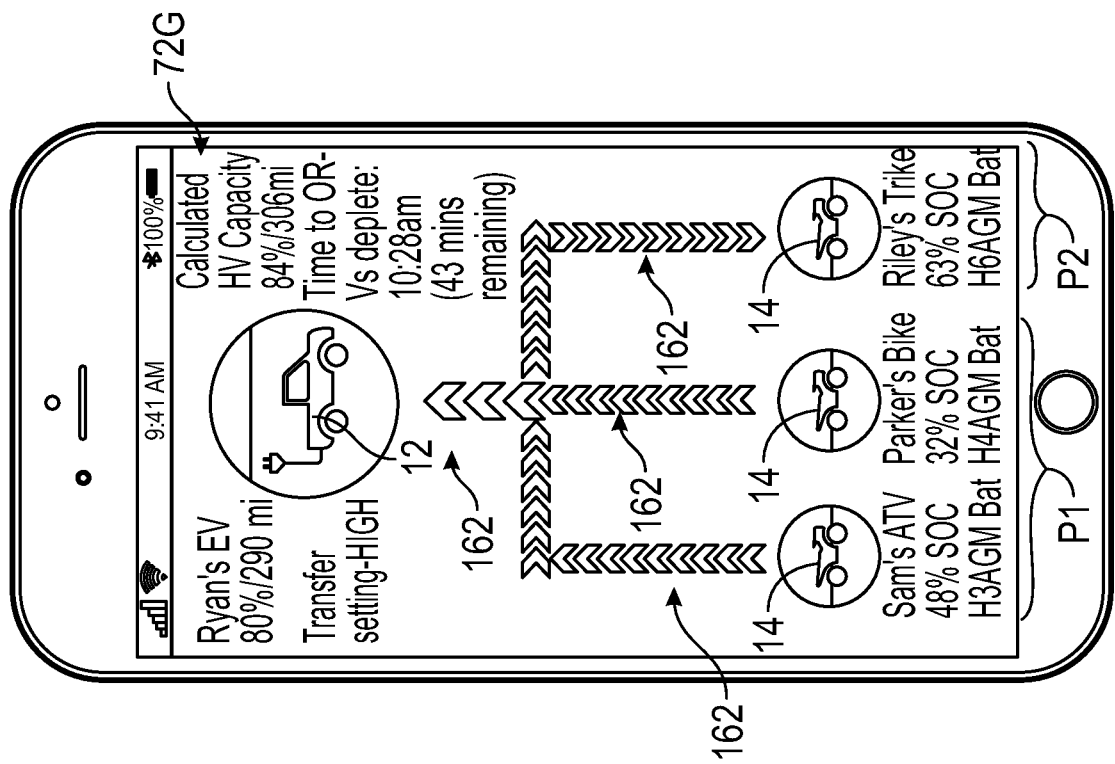
FIG. 18 illustrates another exemplary user interface that can be presented to a user for providing user controls and displaying information related to fifth charging configuration of FIG. 16.

FIG. 18 illustrates another exemplary user interface 72G that can be presented for providing information and allowing the user to modify settings associated with the fifth charging configuration C5. The user interface 72G may include selectable fields 162 that may be manipulated by the user to change the direction of energy flow during the bidirectional energy transfer event. For example, the user may manipulate the selectable fields 162 such that a first portion P1 of the participating electrified recreational vehicles 14 provide power to the electrified vehicle 12 and a second portion P2 of the participating electrified recreational vehicles 14 may receive power from the first portion P1 of the participating electrified recreational vehicles 14.

Figure 19:
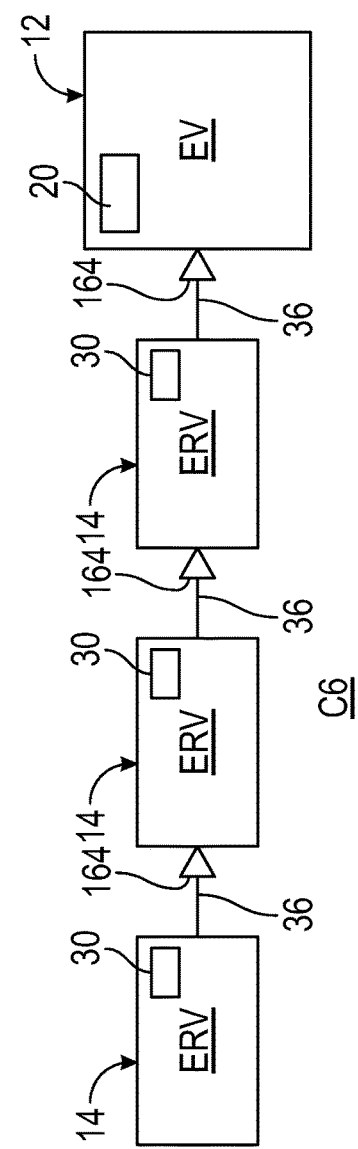
FIG. 19 illustrates a sixth charging configuration of a vehicle-to-recreational vehicle energy transfer system.

FIG. 19 schematically illustrates a sixth charging configuration C6 of the system 10. During the sixth charging configuration C6, power may be transferred in series from the traction battery packs 30 of the multiple participating electrified recreational vehicles 14 to the traction battery pack 20 of the electrified vehicle 12 (as schematically depicted by arrows 164). The sixth charging configuration C6 is another possible serial configuration.

Multiple charge cables 36 may be provided for achieving the sixth charging configuration C6. In an embodiment, the charge cables 36 are arranged in a daisy-chain or pigtail configuration for the sixth charging configuration C6.

Figure 20:
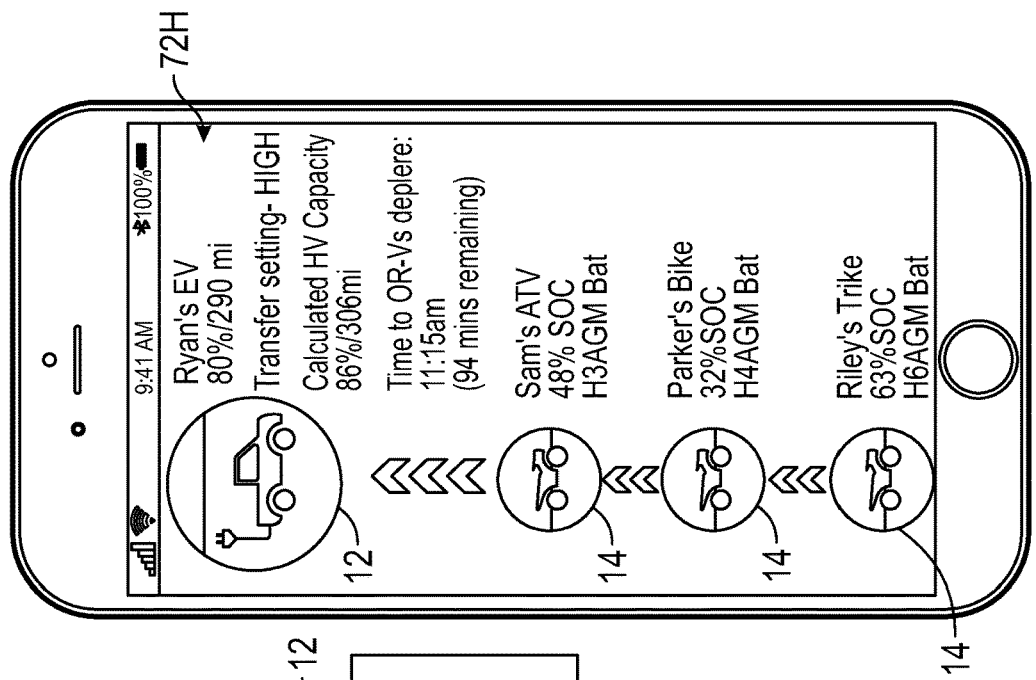
FIG. 20 illustrates an exemplary user interface that can be presented to a user for providing user controls and displaying information related to the sixth charging configuration of FIG. 19.

FIG. 20 illustrates an exemplary user interface 72H that can be presented on the HMI 46, the personal electronic device 68, or both for providing information to the user during the charging event associated with the sixth charging configuration C6 of FIG. 19. The user interface 72H may provide various information to the user, such as the SOC percentage and range of the electrified vehicle 12, the SOC percentages of the participating electrified recreational vehicles 14, transfer setting, calculated battery capacity, estimate time to full charge, etc.

The vehicle-to-recreational vehicle (V2RV) energy transfer systems of this disclosure are designed to provide bidirectional charging between road vehicles and recreational vehicles such as off-road vehicles. The proposed systems enhance electrified vehicle customer experiences by facilitating and executing various charging configurations between the vehicle and one or more participating recreational vehicles.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle-to-recreational vehicle energy transfer system, comprising:
   an electrified vehicle;
   an electrified recreational vehicle; and
   a control module programmed to control a transfer of energy from the electrified vehicle to the electrified recreational vehicle or from the electrified recreational vehicle to the electrified vehicle during a bidirectional energy transfer event,
   wherein the control module is further programmed to command an alert system of the electrified vehicle to emit audible instructions for guiding a connection of the electrified vehicle to the electrified recreational vehicle prior to performing the bidirectional energy transfer event.

2. The system as recited in claim 1, wherein the electrified vehicle includes a first traction battery pack and a first electric machine, and the electrified recreational vehicle includes a second traction battery pack and a second electric machine.

3. The system as recited in claim 1, comprising a charge cable that connects to a first charge port assembly of the electrified vehicle and a second charge port assembly of the electrified recreational vehicle during the bidirectional energy transfer event.

4. The system as recited in claim 1, wherein the control module is further programmed to interface with a bidirectional power transfer system of at least one of the electrified vehicle and the electrified recreational vehicle for controlling the transfer of energy between the electrified vehicle and the electrified recreational vehicle.

5. The system as recited in claim 1, wherein the control module is a component of the electrified vehicle.

6. The system as recited in claim 1, wherein the control module is further programmed to communicate a charging details request signal to the electrified recreational vehicle.

7. The system as recited in claim 6, wherein the control module is further programmed to receive a charging profile from the electrified recreational vehicle.

8. The system as recited in claim 1, wherein the control module is further programmed to command an end to the transfer of energy in response to exceeding a predefined threshold.

9. The system as recited in claim 1, comprising a human machine interface or a personal electronic device associated with the electrified vehicle, wherein the human machine interface, the personal electronic device, or both is configured through a cloud-based application to provide a user interface for modifying at least one charge setting associated with the bidirectional energy transfer event.

10. The system as recited in claim 9, wherein the at least one charge setting includes a charging transfer direction, an alarm setting, a timer setting, a transfer speed setting, a state of charge (SOC) percentage setting, or a donor range setting.

11. The system as recited in claim 9, wherein the user interface includes a selectable field configured to allow a user to change a direction of energy flow during the bidirectional energy transfer event.

12. The system as recited in claim 1, wherein the electrified vehicle is a pickup truck, and the electrified recreational vehicle is an all-terrain vehicle, a utility vehicle, a motorcycle, or a snowmobile.

13. An electrified vehicle, comprising:
    a traction battery pack;
    a bidirectional power transfer system operably connected to the traction battery pack; and
    a control module programmed to control the bidirectional power transfer system to either receive power for charging the traction battery pack or send power from the traction battery pack to an electrified recreational vehicle separate from the electrified vehicle during a bidirectional energy transfer event, wherein the control module is further programmed to communicate a charging details request signal to the electrified recreational vehicle and is further programmed to receive a charging profile from the electrified recreational vehicle, wherein the electrified recreational vehicle is an all-terrain vehicle (ATV), a utility vehicle (UTV), a motorcycle, a bike, a dirt bike, a snowmobile, or an off-road vehicle, wherein the control module is further programmed to control a transfer of energy from the electrified vehicle to two or more electrified recreational vehicles or from the two or more electrified recreational vehicles to the electrified vehicle during the bidirectional energy transfer event.

14. The electrified vehicle as recited in claim 13, comprising a telecommunications module configured for establishing bidirectional communications between the electrified vehicle and the electrified recreational vehicle.

15. The electrified vehicle as recited in claim 13, wherein the control module is further programmed to command an end to the transfer of energy in response to exceeding a predefined threshold.

16. The electrified vehicle as recited in claim 13, comprising a human machine interface or a personal electronic device, wherein the human machine interface, the personal electronic device, or both is configured through a cloud-based application to provide a user interface for modifying at least one charge setting associated with the bidirectional energy transfer event.

17. The electrified vehicle as recited as recited in claim 16, wherein the user interface includes a selectable field configured to allow a user to change a direction of energy flow during the bidirectional energy transfer event.

18. The electrified vehicle as recited in claim 13, wherein the electrified recreational vehicle is positioned within a cargo space of the electrified vehicle during the bidirectional energy transfer event.

\* \* \* \* \*